Patented Dec. 23, 1947

2,433,097

UNITED STATES PATENT OFFICE 2,433,097

POLYVINYL ACETALS PLASTICIZED WITH PARTIAL ESTERS OF POLYHYDRIC ALCOHOLS WITH UNSATURATED ALIPHATIC ACIDS

Max O. Debacher, Springfield, Mass., assignor to Monsanto Chemical Company, St. Louis, Mo., a corporation of Delaware No Drawing. Application February 25, 1944, Serial No. 523,888

16 Claims. (Cl. 260—36)

This invention relates to improved compositions of matter comprising polyvinyl acetal resins and partial esters of polyhydric alcohols with unsaturated aliphatic acids.

Plasticized polyvinyl acetal resin compositions have many advantageous characteristics as is known to those skilled in the art. However, for certain purposes, the use of such compositions has been restricted to some extent, thus making it desirable to effect improvements in certain properties as, for example, in retention of plasticizer, and elasticity.

It is an object of this invention to provide improved polyvinyl acetal resin compositions. A further object is to provide plasticized polyvinyl acetal resins having a high degree of retention of plasticizer over long periods of time and, particularly, at elevated temperatures. Another object is to provide plasticized polyvinyl acetal resins having a high degree of elasticity.

According to the present invention, improved compositions are prepared comprising polyvinyl acetal resins and partial esters of polyhydric alcohols with unsaturated aliphatic acids. According to one embodiment of this invention, these compositions comprise polyvinyl acetal resins and partial esters of polyhydric alcohols with unsaturated aliphatic acids having more than 9 and preferably from 10 to 20 carbon atoms. According to a particular embodiment of this invention the esters employed are glyceryl monoesters of unsaturated aliphatic acids having more than 9 and preferably from 10 to 20 carbon atoms. Partial esters of polyhydric alcohols and olefinic-unsaturated aliphatic acids are particularly preferred.

A particularly valuable embodiment of this invention comprises plasticized polyvinyl acetal resins containing as a plasticizer a glyceryl monoester of an olefinic-unsaturated aliphatic acid containing from 17 to 19 carbon atoms. Such compositions are found to possess an exceptionally high degree of elasticity and to permit the inclusion of exceptionally large quantities of extenders, for example, inorganic fillers such as whiting while maintaining a high degree of elasticity.

Polyvinyl acetal resins may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al., Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, cyclohexanone and the like and mixtures thereof may be employed. In general, polyvinyl acetal resins made from saturated lower aliphatic aldehydes are preferred and, in particular, polyvinyl acetal resins made with saturated aliphatic aldehydes containing less than 6 carbon atoms and especially those made with butyraldehyde, are preferred. When the polyvinyl acetal resins contain ester groups, the nature of the ester groups may be substantially varied, but are preferably residues of saturated lower aliphatic acids such as acetic, propionic and butyric acids.

The polyvinyl acetal resins contemplated according to the invention have at least about 30% of the ester groups in the original polyvinyl ester replaced by acetal groups and do not have more than about 50% of said ester groups replaced by hydroxyl groups.

Acocrding to one embodiment of this invention, the polyvinyl acetal resins employed contain, on a weight basis, at least 5% hydroxyl groups calculated as polyvinyl alcohol, and preferably, from 5 to 25% hydroxyl groups. These resins also contain from 0 to 30% ester groups calculated as polyvinyl ester, the ester groups preferably being acetate.

According to one embodiment of this invention, when the acetal groups are butyraldehyde acetal, the resins employed may be considered to be made up, on a weight basis, of 12–22% hydroxyl groups calculated as polyvinyl alcohol and from 15–30% acetate groups calculated as polyvinyl acetate and the balance substantially acetal. According to another embodiment, when the acetal groups are butyraldehyde acetal, the resins employed may be considered to be made up, on a weight basis, of 16–20% hydroxyl groups calculated as polyvinyl alcohol, less than 3% acetate groups calculated as polyvinyl acetate and the balance substantially butyraldehyde acetal.

According to another embodiment, when the acetal groups are butyraldehyde acetal, the resins employed may be considered to be made up, on a weight basis, of 5–13% hydroxyl groups calculated as polyvinyl alcohol, less than 3% acetate groups calculated as polyvinyl acetate and the balance substantially butyraldehyde acetal.

According to one embodiment of this invention, when the acetal groups are acetaldehyde acetal, the polyvinyl acetal resin employed may be considered to be made up, on a weight basis, of 5–15% hydroxyl groups calculated as polyvinyl alcohol, 15–20% acetate groups calculated as polyvinyl acetate, and the balance substantially acetaldehyde acetal.

According to one embodiment of this invention, when the acetal is formaldehyde acetal, the polyvinyl acetal resin may be considered to be made up, on a weight basis, of 5–10% hydroxyl groups calculated as polyvinyl alcohol, 10-15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65-50 mol per cent acetaldehyde acetal and 35-50 mol per cent butyraldehyde acetal.

The polyvinyl esters from which the polyvinyl acetal resins are derived may vary substantially in degree of polymerization as evidenced by the viscosity of 1-molar benzene solutions which may vary, for example, from 5-75 centipoises at 20° C.

The ester plasticizers according to this invention are polyhydric alcohol partial esters, the polyhydric alcohol residues thereof containing at least one free hydroxyl group, made with unsaturated aliphatic acids. As examples of polyhydric alcohols from which these esters may be made are glycerin, mannitol, sorbitol, glucose, erythritol, pentaerythritol, glycols such as ethylene glycol, propylene glycol, diethylene glycol, triethylene glycol and the like. Examples of unsaturated aliphatic acids which may be employed in preparing the partial esters are mono-olefinic-unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 3-hexenoic acid, and 9-octadecenoic acid; diolefinic-unsaturated aliphatic acids such as 2,4-pentadienoic acid, 2,4-hexadienoic acid, 3,7-dimethyl-2,6-octadienoic acid, 9,12-octadecadienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; halogenated unsaturated acids, for example, 2-chloro-2-propenoic acid and 3-chloro-2-propenoic acid; monochloro-9-octadecenoic acid, monochloro-12-hydroxy-9-octadecenoic acid and halogenated acids derived by dehydration of castor oil acids follower by chlorination; acetylenic unsaturated aliphatic acids such as propynoic, butynoic, pentynoic, amyl propynoic, 7-hexadecynoic, 9-octadecynoic and 13-docosynoic acids.

Mixtures of polyhydric alcohol partial esters of unsaturated aliphatic acids may be employed and when desired, mixtures of the foregoing unsaturated esters with polyhydric alcohol partial esters of saturated aliphatic acids, as for example, esters derived from the mixtures of acids occurring in various oils, as for example, linseed, castor, tung, soya bean, perilla, corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, partial esters may be used which are made of the mixtures of acids occurring in oils such as palm kernel oil, cocoanut oil and the like, which mixtures of acids contain substantial amounts of unsaturated acids such as those mentioned above, but do not predominate therein.

Mixed esters may be employed in which at least one of the acid residues is unsaturated, for example, glyceryl diesters, for example, glyceryl diester in which one acid residue is derived from 9-octadecenoic acid and one from octadecanoic acid.

According to a particular embodiment of this invention, the esters employed are glyceryl monoesters of the unsaturated acids present in the oils mentioned above, for example, glyceryl-mono-12-hydroxy-9-octadecenoate, glyceryl-mono-9,12-octadecadienoate, glyceryl-mono-9,12,15-octadecatrienoate, glyceryl-mono-9-octadecenoate and the like.

The following examples illustrate the improved compositions of the present invention, but are not limitative thereof. Where parts are specified, the parts are by weight.

The polyvinyl butyraldehyde acetal resin employed in the examples is prepared from a polyvinyl acetate of such a degree of poylmerization that a 1-molar benzene solution possesses a viscosity of substantially 50-55 centipoises at 20° C. The polyvinyl butyraldehyde acetal resin may be considered to be made up on a weight basis of 16-20% hydroxyl groups calculated as polyvinyl alcohol, less than 3% acetate groups calculated as polyvinyl acetate and the balance substantially butyraldehyde acetal.

*Example I*

| | Parts |
|---|---|
| Polyvinyl butyraldehyde acetal resin | 100 |
| Glyceryl mono-9-octadecenoate | 90 |

The foregoing ingredients may be mixed in a suitable manner, for example, by means of a Banbury mixer. The resulting composition is a tough, extremely elastic, water-resistant, homogeneous mass, capable of being formed, for example, by extrusion, into a sheet or other articles, or of being dissolved in a suitable solvent, for example, an ethanol-toluene mixture, or otherwise processed for its ultimate use. No exudation of plasticizer from the composition of this example occurs on long continued use and the composition shows a high retentivity of plasticizer over long periods of time, even at elevated temperatures.

*Example II*

| | Parts |
|---|---|
| Polyvinyl butyraldehyde acetal resin | 100 |
| Glyceryl mono-12-hydroxy-9-octadecenoate | 80 |

The foregoing ingredients are made into a homogeneous composition in the same manner as that described in Example I. The resulting composition is found to have properties similar to those of the product described in Example I.

The following is an example employing a mixture of plasticizers, only one of which is a partial ester of a polyhydroxy alcohol and an unsaturated fatty acid.

*Example III*

| | Parts |
|---|---|
| Polyvinyl butyraldehyde acetal resin | 100 |
| Glyceryl mono-9-octadecenoate | 45 |
| Dibutyl sebacate | 45 |

The composition prepared from the above ingredients is homogeneous and highly elastic, but does not possess as high a degree of plasticizer retentivity as the products described in Examples I and II. In place of dibutyl sebacate, butyl-12-hydroxy-9-octadecenoate, triethylene glycol dihexoate, the dimethyl amide of acids derived from castor oil, dibutyl phthalate or the like may be employed.

The following example illustrates the use of a diester:

*Example IV*

| | Parts |
|---|---|
| Polyvinyl butyraldehyde acetal resin | 100 |
| Glyceryl diester of linseed oil acids | 45 |
| Butyl 12-hydroxy-9-octadecenoate | 45 |

The foregoing ingredients may be compounded in the usual manner to produce a product having properties similar to the product described in Example II.

In general, at least about 25 and preferably, from about 45 to 150 parts of the partial esters of this invention are employed for every 100 parts of polyvinyl acetal resin. When mixtures with other plasticizers are employed, at least about 25% of the plasticizer content usually consists of the partial esters of this invention and preferably at least about 50%.

The compositions of this invention may be formed into sheets or other articles or may be used for coating such materials as cloth, paper, wood, metal, concrete or other base material. Coatings on cloth may be advantageously made by calendering or by applying a solution of the composition and then evaporating the solvent. When advantageous, fillers may be included, as for example, carbon black, whiting and the like.

An extremely advantageous characteristic of the compositions of this invention is the extremely high proportions of plasticizer that may be employed without rendering the resulting compositions unduly tacky or subject to exudation on standing. A particularly advantageous characteristic of polyvinyl acetal resins plasticized according to this invention is their high flexibility at low temperatures.

Especially valuable products may be prepared by combining with the compositions of this invention cross-linking agents as for example, aldehyde resins such as phenol aldehyde resins or amino resins such as aminotriazine-aldehyde resins, e. g., melamine-formaldehyde resins, urea-aldehyde resins and dicyandiamide-aldehyde resins; sulfur, selenium, and the like.

What is claimed is:

1. A composition comprising a polyvinyl acetal resin and a glyceryl monoester of an unsaturated aliphatic carboxylic acid containing carbon to carbon unsaturation and more than 9 but less than 21 carbon atoms, said acetal resin containing from 5 to 25% hydroxyl groups by weight calculated as polyvinyl alcohol, up to 30% acetate groups by weight calculated as polyvinyl acetate and the balance substantially acetal.

2. A composition as defined in claim 1 in which the polyvinyl acetal resin is made from more than one aldehyde.

3. A composition as defined in claim 16 in which the polyvinyl acetal resin is a polyvinyl butyraldehyde acetal resin.

4. A composition as defined in claim 15 in which the polyvinyl acetal resin is a polyvinyl butyraldehyde acetal resin.

5. A composition comprising a polyvinyl butyraldehyde acetal resin containing 5-25% hydroxyl groups by weight, calculated as polyvinyl alcohol, up to 30% acetate groups by weight calculated as polyvinyl acetate and the balance substantially acetal, and a glyceryl monoester of an unsaturated aliphatic carboxylic acid containing carbon to carbon unsaturation, the acid residue thereof containing more than 9 but less than 21 carbon atoms.

6. A composition as defined in claim 5 in which the polyvinyl acetal resin contains from 5 to 12% hydroxyl groups calculated as polyvinyl alcohol.

7. A composition as defined in claim 5 in which the polyvinyl acetal resin contains 5 to 12% hydroxyl groups calculated as polyvinyl alcohol and 0 to 3% acetate groups calculated as polyvinyl acetate.

8. A composition comprising a polyvinyl butyraldehyde acetal resin containing from 5-25% hydroxyl groups by weight, calculated as polyvinyl alcohol, up to 30% acetate groups by weight calculated as polyvinyl acetate and the balance substantially acetal, and a glyceryl monoester of an unsaturated aliphatic carboxylic acid containing carbon to carbon unsaturation, the acid residue thereof containing more than 16 but less than 20 carbon atoms.

9. A composition as defined in claim 8 in which the ester is glyceryl mono-9-octadecenoate.

10. A composition as defined in claim 8 in which the ester is glyceryl mono-9-octadecenoate and in which from 25-150 parts of said ester is present for every 100 parts of polyvinyl acetal resin.

11. A composition as defined in claim 8 in which the ester is glyceryl mono-12-hydroxy-9-octadecenoate.

12. A composition as defined in claim 8 in which the ester is glyceryl mono-12-hydroxy-9-octadecenoate and in which from 25-150 parts of said ester is present for every 100 parts of polyvinyl acetal resin.

13. A composition as defined in claim 8 in which the ester is glyceryl mono-9-octadecenoate and in which from 45 to 150 parts of said ester are present for every 100 parts of polyvinyl acetal resin.

14. A composition as defined in claim 8 in which the ester is glyceryl mono-9-octadecenoate and in which 90 parts of said ester are present for every 100 parts of polyvinyl acetal resin.

15. A composition comprising a polyvinyl acetal resin containing, on a chemical equivalent basis, at least 30% acetal groups and not more than 50% hydroxyl groups, and a partial ester of glycerine and an unsaturated aliphatic carboxylic acid containing carbon to carbon unsaturation, the acid residue thereof containing at least 10 carbon atoms.

16. A composition comprising a polyvinyl acetal resin containing, on a weight basis, 5-25% hydroxyl groups calculated as polyvinyl alcohol, up to 30% ester groups calculated as polyvinyl ester and the balance substantially acetal, and a partial ester of glycerine and an unsaturated aliphatic carboxylic acid containing carbon to carbon unsaturation, the acid residue thereof containing more than 9 but less than 21 carbon atoms.

MAX O. DEBACHER.

REFERENCES CITED

The following references are of record in the file of this patent:

UNITED STATES PATENTS

| Number | Name | Date |
|---|---|---|
| 2,079,108 | Dreyfus | May 4, 1937 |
| 2,160,532 | Barrett | May 30, 1939 |
| 2,222,490 | Robertson | Nov. 19, 1940 |
| 2,290,180 | Hershberger | July 21, 1942 |
| 2,375,588 | Ryan | May 8, 1945 |
| 2,381,247 | Barth | Aug. 7, 1945 |

FOREIGN PATENTS

| Number | Country | Date |
|---|---|---|
| 413,718 | Great Britain | July 20, 1934 |

OTHER REFERENCES

Glyco Products Co., Advertisement in Chemical and Engineering News, vol. 21, No. 19, October 10, 1943, page 1659.